(12) United States Patent
Saunders et al.

(10) Patent No.: US 12,372,944 B2
(45) Date of Patent: Jul. 29, 2025

(54) CAUSING A ROBOT TO EXECUTE A MISSION USING A BEHAVIOR TREE AND A LEAF NODE LIBRARY

(71) Applicant: AURORA FLIGHT SCIENCES CORPORATION, A SUBSIDIARY OF THE BOEING COMPANY, Manassas, VA (US)

(72) Inventors: Jeffery Saunders, Quincy, MA (US); Benjamin C. Stringer, Boston, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 1004 days.

(21) Appl. No.: 17/148,093

(22) Filed: Jan. 13, 2021

(65) Prior Publication Data

US 2022/0035339 A1    Feb. 3, 2022

Related U.S. Application Data

(60) Provisional application No. 63/059,397, filed on Jul. 31, 2020.

(51) Int. Cl.
*G05B 19/4155* (2006.01)
*G05D 1/00* (2006.01)
(Continued)

(52) U.S. Cl.
CPC ....... *G05B 19/4155* (2013.01); *G05D 1/0088* (2013.01); *G05D 1/0291* (2013.01);
(Continued)

(58) Field of Classification Search
CPC .................................................. G05B 19/4155
See application file for complete search history.

(56) References Cited

U.S. PATENT DOCUMENTS 7,103,447 B2 * 9/2006 Di Profio ............... G06N 3/008
700/262
8,571,745 B2 * 10/2013 Pack ...................... G06N 3/008
701/25
(Continued)

OTHER PUBLICATIONS

Andreas Klockner. Behavior Trees for UAV Mission Management. In Matthias Horbach, editor, Informatik 2013: Informatik angepasst an Mensch, Organisation und Umwelt, vol. P-220 of GI-Edition-Lecture Notes in Informatics (LNI)—Proceedings, pp. 57-68, Koblenz, Germany, Sep. 16-20, 2013. (Year: 2013).*

(Continued)

*Primary Examiner* — Michael A Berns
(74) *Attorney, Agent, or Firm* — Harrity & Harrity, LLP

(57) ABSTRACT

A method is provided for causing one or more robots to execute a mission. The method includes determining a behavior tree in which the mission is modeled, and causing the one or more robots to execute the mission using the behavior tree and a leaf node library. The behavior tree is expressed as a directed tree of nodes including a switch node, a trigger node representing a selected task, and action nodes representing others of the tasks. The switch node is connected to the trigger node and the action nodes in a parent-child relationship in which the trigger node and the action nodes are children of the switch node. The trigger node is a first of the children that, when ticked by the switch node, returns an identifier of one of the action nodes to trigger the switch node to next tick the one of the action nodes.

24 Claims, 11 Drawing Sheets

(51) Int. Cl.
　　*G05D 1/60*　　　(2024.01)
　　*G06N 5/01*　　　(2023.01)
　　*G05D 101/10*　　(2024.01)
　　*G05D 109/20*　　(2024.01)

(52) U.S. Cl.
　　CPC ............... *G05D 1/60* (2024.01); *G06N 5/01* (2023.01); *G05B 2219/33051* (2013.01); *G05B 2219/50391* (2013.01); *G05D 2101/10* (2024.01); *G05D 2109/20* (2024.01)

(56) References Cited

U.S. PATENT DOCUMENTS

| | | | |
|---|---|---|---|
| 9,557,742 | B2 | 1/2017 | Paduano |
| 10,453,351 | B2 | 10/2019 | Choi et al. |
| 10,742,738 | B2 * | 8/2020 | Rangarajan ............ H04L 67/12 |
| 10,878,706 | B2 * | 12/2020 | Saunders ............... G05D 1/101 |
| 11,338,434 | B2 * | 5/2022 | Tenorth ............. G05B 19/0426 |
| 11,379,287 | B2 * | 7/2022 | Neeter ................ G06F 11/0733 |
| 11,429,101 | B2 * | 8/2022 | Ryan ..................... G05B 19/042 |
| 11,527,165 | B2 * | 12/2022 | Sprengart ............ G05D 1/0202 |
| 12,165,529 | B2 * | 12/2024 | Durno ...................... G08G 5/74 |
| 2017/0019479 | A1 | 1/2017 | Rangarajan et al. |
| 2019/0086894 | A1 | 3/2019 | Tenorth |
| 2019/0095725 | A1 | 3/2019 | Kalghatgi et al. |
| 2019/0324456 | A1 | 10/2019 | Saunders |
| 2020/0050950 | A1 * | 2/2020 | Hadad Segev ......... G06F 9/453 |
| 2020/0118446 | A1 | 4/2020 | Saunders |
| 2022/0035339 | A1 * | 2/2022 | Saunders ............. G05D 1/0088 |
| 2022/0332344 | A1 * | 10/2022 | Matsunami ........... G06F 9/4498 |

OTHER PUBLICATIONS

Sprague et al., "Improving Modularity of AUV Control Systems Using Behavior Trees", Cornell University Library, Nov. 2018, 6 pgs.

Menglu et al., "A Modular Mission Management System for Micro Aerial Vehicles", 2018 IEEE 14th International Conference on Control and Automation (ICCA), IEEE, Jun. 2018, pp. 293-299.

European Search Report issued Dec. 8, 2021 in European Application No. 21187635.4.

Ogren, P. "Increasing Modularity of UAV Control Systms using Computer Game Behavior Trees", American Institute of Aeornautics and Astronautics, Sep. 2012, pp. 1-8.

"Behavior tree (artificial intelligence, robotics and control)", Wikipedia, Dec. 2020, retrieved from https://en.wikipedia.org/w/index.phptitle=Behavior_tree_(artificial_intelligence,_robotics_and_control) oldid=994954127.

Davies, J. et al., "Comparative Analysis of ACAS-Xu and DAIDALUS Detect-and-Avoid Systems", NASA, Feb. 2018, pp. 1-36.

Munoz, C. et al., "DAIDALUS: Detect and Avoid Alerting Logic for Unmanned Systems", NASA. Sep. 2015, pp. 1-12.

* cited by examiner

CAUSING A ROBOT TO EXECUTE A MISSION USING A BEHAVIOR TREE AND A LEAF NODE LIBRARY

CROSS-REFERENCE TO RELATED APPLICATION(S)

This application claims priority to U.S. Provisional Application No. 63/059,397, filed Jul. 31, 2020, entitled Causing a Robot to Execute a Mission Using a Behavior Tree and a Leaf Node Library, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on weld-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems, as they are not well-equipped to support the addition of new modules to the autonomy system. Furthermore, existing autonomy systems may or may not be structured for rapid adaptation to new platforms through parameterization.

Therefore it would be desirable to have a system and method that takes into account at least some of the issues discussed above, as well as other possible issues.

BRIEF SUMMARY

A mission is a deployment of a robot (one or more robots) to achieve one or more mission objectives. A mission may be decomposed into behaviors or actions involving the robot maneuvering with optional sensor and/or effector scheduling; and a mission may be enhanced by contemplating contingency events whose resolution makes use of other behaviors. According to example implementations, a robot may be managed to execute tasks to implement these behaviors with specific parameters and capabilities, and these tasks may be modeled in a behavior tree of nodes. The behavior tree may decouple the semantic of a specific mission from its general structure; and therefore, decouple mission planning from mission execution. This may in turn separate non-predictive decision making from predictive mission making. A mission planning and mission execution may together realize autonomic behavior.

The present disclosure thus includes, without limitation, the following example implementations.

Some example implementations provide a method of causing one or more robots to execute a mission, the method comprising identifying the mission including tasks that are executable to cause the one or more robots to execute respective maneuvers; determining a behavior tree in which the mission is modeled, the behavior tree expressed as a directed tree of nodes including a switch node, a trigger node representing a selected task, and action nodes representing others of the tasks, the switch node connected to the trigger node and the action nodes in a parent-child relationship in which the trigger node and the action nodes are children of the switch node, the trigger node being a first of the children that, when ticked by the switch node, returns an identifier of one of the action nodes to trigger the switch node to next tick the one of the action nodes; and causing the one or more robots to execute the mission using the behavior tree and a leaf node library including the tasks executable to cause the one or more robots to execute the respective maneuvers.

In some example implementations of the method of any preceding example implementation, or any combination of any preceding example implementations, causing the one or more robots to execute the mission includes for a robot of the one or more robots, accessing mission data including the behavior tree in which the mission is modeled; traversing the behavior tree of nodes; and when the switch node is ticked, ticking the trigger node to cause the trigger node representing the selected task to call on the leaf node library to execute the selected task and thereby cause the robot to execute a respective maneuver, the trigger node returning the identifier of one of the action nodes to the switch node.

In some example implementations of the method of any preceding example implementation, or any combination of any preceding example implementations, causing the one or more robots to execute the mission further includes for the robot of the one or more robots, ticking the one of the action nodes by the switch node according to the identifier, the ticking of the one of the action nodes causing the one of the action nodes representing one of the others of the tasks to call on the leaf node library to execute the one of the others of the tasks and thereby cause the robot to execute another of the respective maneuvers.

In some example implementations of the method of any preceding example implementation, or any combination of any preceding example implementations, the tasks include a nominal sequence of selected tasks including the selected task and a next selected task, and an alternate task (one or more alternate tasks) to be executed in place of the next selected task when a contingency event occurs during execution of the selected task, and wherein determining the behavior tree includes determining the behavior tree in which the others of the tasks represented by the action nodes include the next selected task and the alternate task.

In some example implementations of the method of any preceding example implementation, or any combination of any preceding example implementations, causing the one or more robots to execute the mission includes for a robot of the one or more robots, accessing mission data including the behavior tree in which the mission is modeled; traversing the behavior tree of nodes; and when the switch node is ticked, ticking the trigger node to cause the trigger node representing the selected task to call on the leaf node library to execute the selected task and thereby cause the robot to execute a respective maneuver, the trigger node returning the identifier of the next selected task to the switch node absent occurrence of the contingency event.

In some example implementations of the method of any preceding example implementation, or any combination of any preceding example implementations, causing the one or more robots to execute the mission further includes for the robot of the one or more robots, ticking the one of the action nodes by the switch node according to the identifier, the ticking of the one of the action nodes causing the one of the action nodes representing the next selected task to call on the leaf node library to execute the next selected task and thereby cause the robot to execute another respective maneuver.

In some example implementations of the method of any preceding example implementation, or any combination of any preceding example implementations, causing the one or more robots to execute the mission includes for a robot of the one or more robots, accessing mission data including the behavior tree in which the mission is modeled; traversing the behavior tree of nodes; and when the switch node is ticked, ticking the trigger node to cause the trigger node representing the selected task to call on the leaf node library to execute the selected task and thereby cause the robot to execute a respective maneuver; and detecting occurrence of the contingency event during execution of the selected task, the trigger node returning the identifier of the alternate task to the switch node in response to the occurrence of the contingency event.

In some example implementations of the method of any preceding example implementation, or any combination of any preceding example implementations, causing the one or more robots to execute the mission further includes for the robot of the one or more robots, ticking the one of the action nodes by the switch node according to the identifier, the ticking of the one of the action nodes causing the one of the action nodes representing the alternate task to call on the leaf node library to execute the alternate task and thereby cause the robot to execute another respective maneuver.

Some example implementations provide an apparatus for causing one or more robots to execute a mission, the apparatus comprising a memory having computer-readable program code stored therein; and processing circuitry configured to access the memory, and execute the computer-readable program code to cause the apparatus to at least perform the method of any preceding example implementation, or any combination of any preceding example implementations.

Some example implementations provide a computer-readable storage medium for causing one or more robots to execute a mission, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
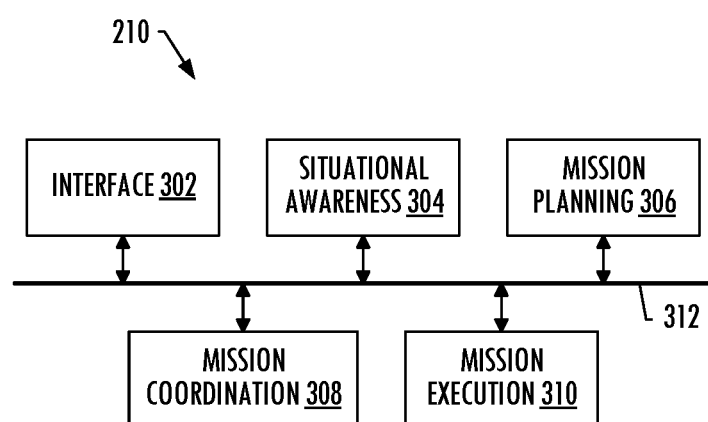
Figure 4:
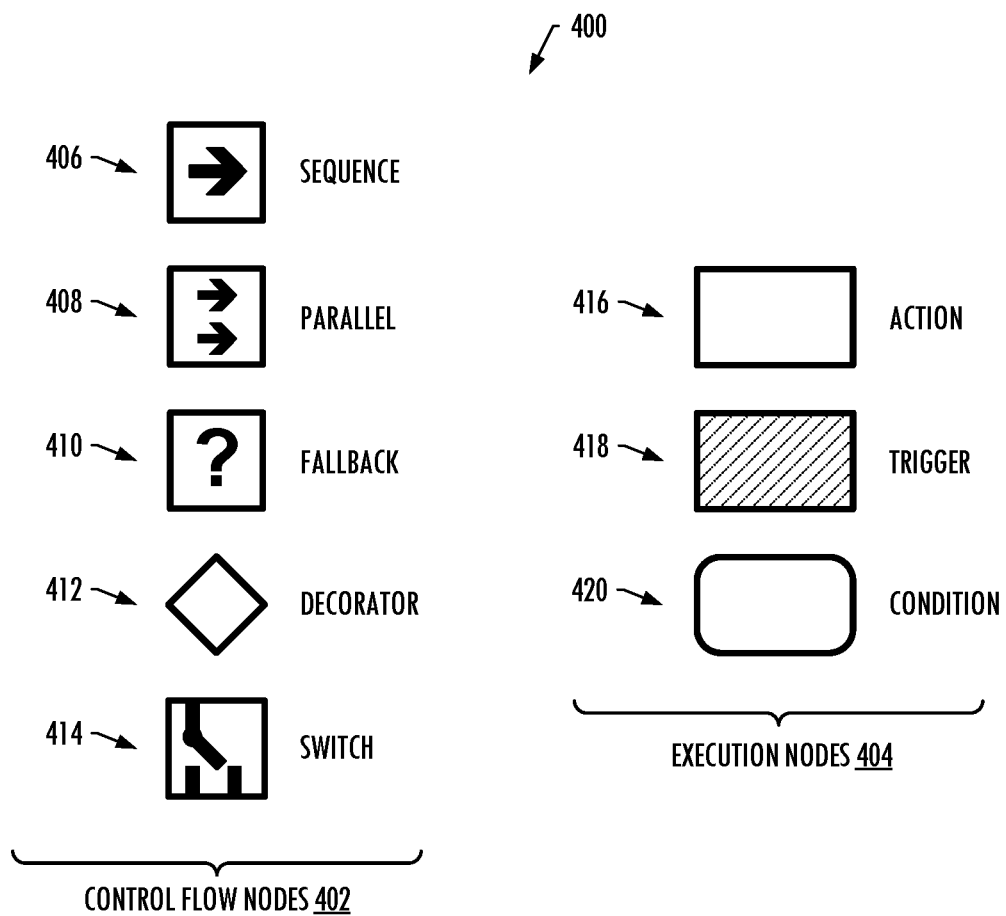
Figure 5A:
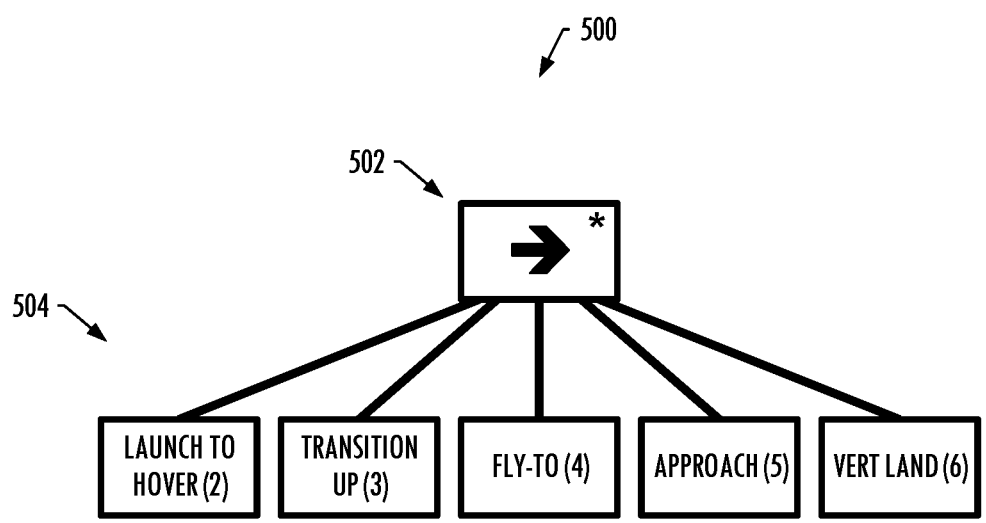
Figure 5B:
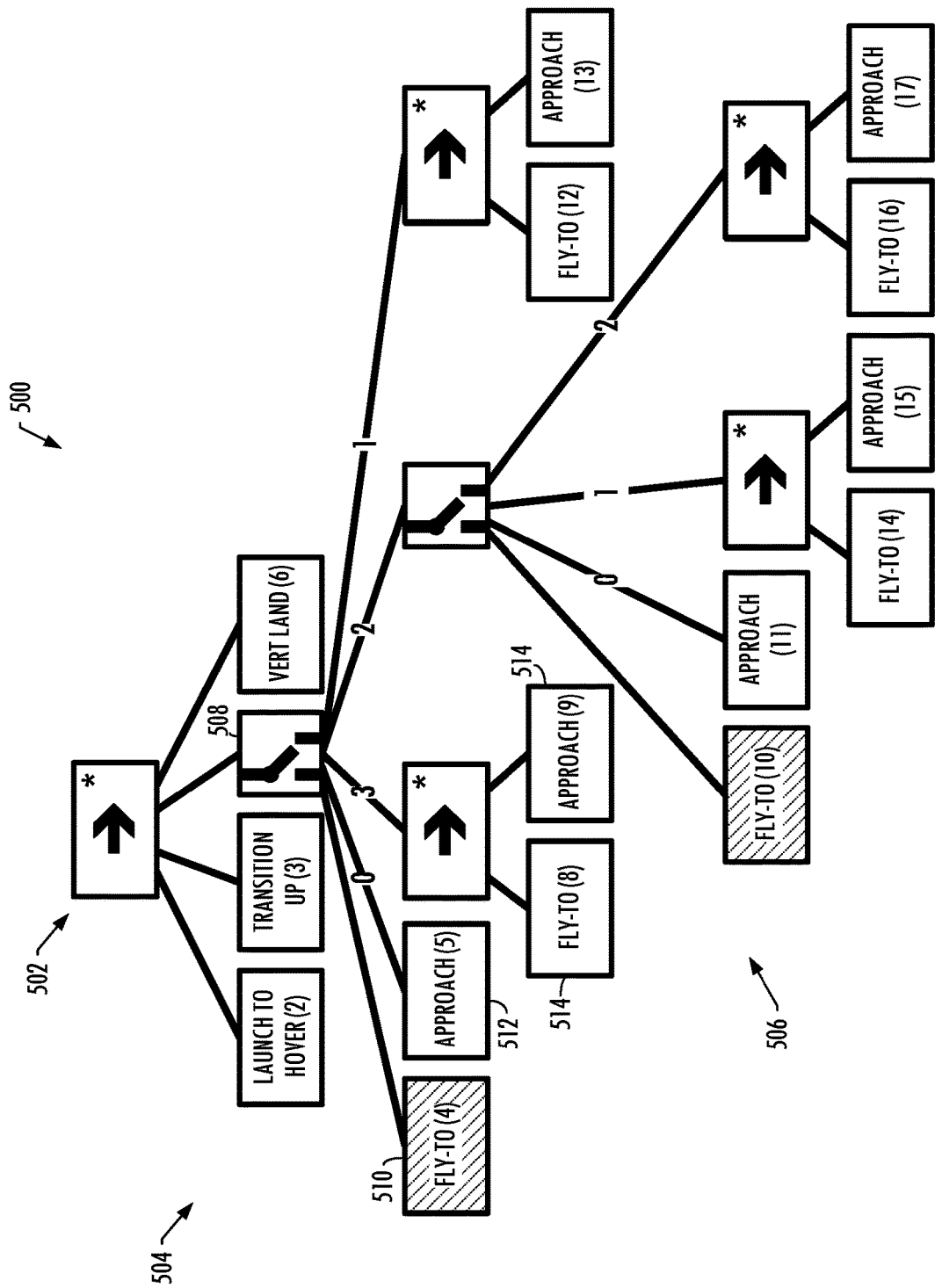
Figure 6:
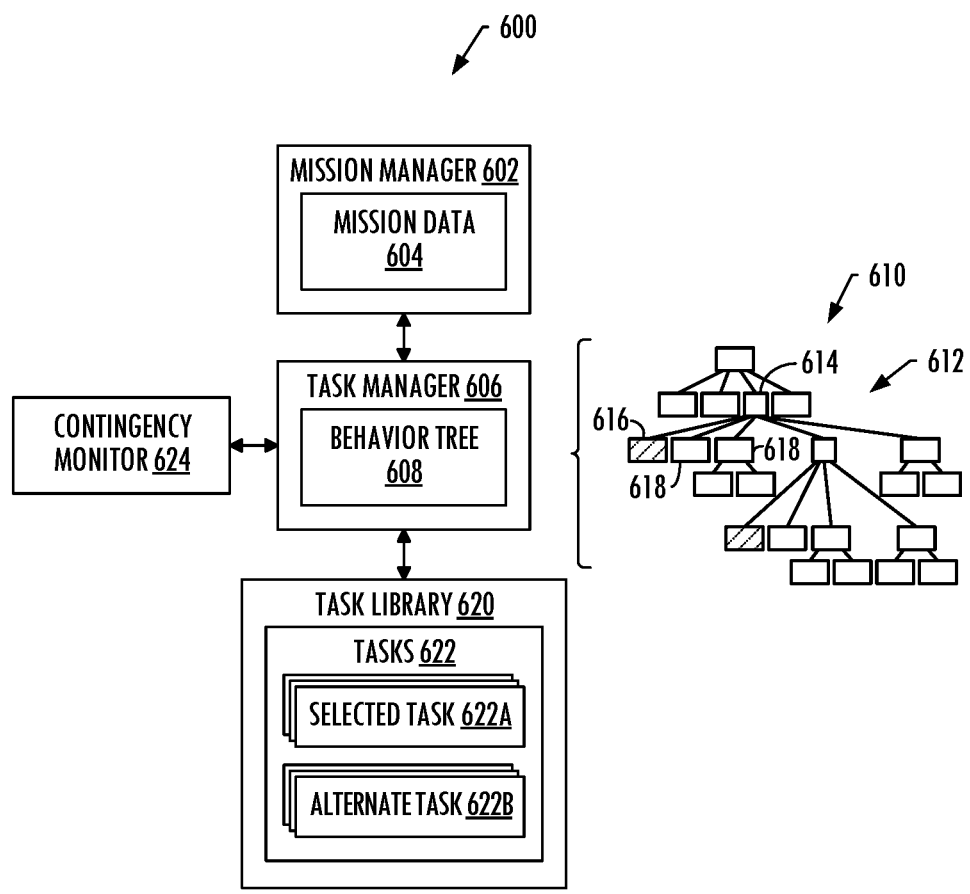
Figure 7A:
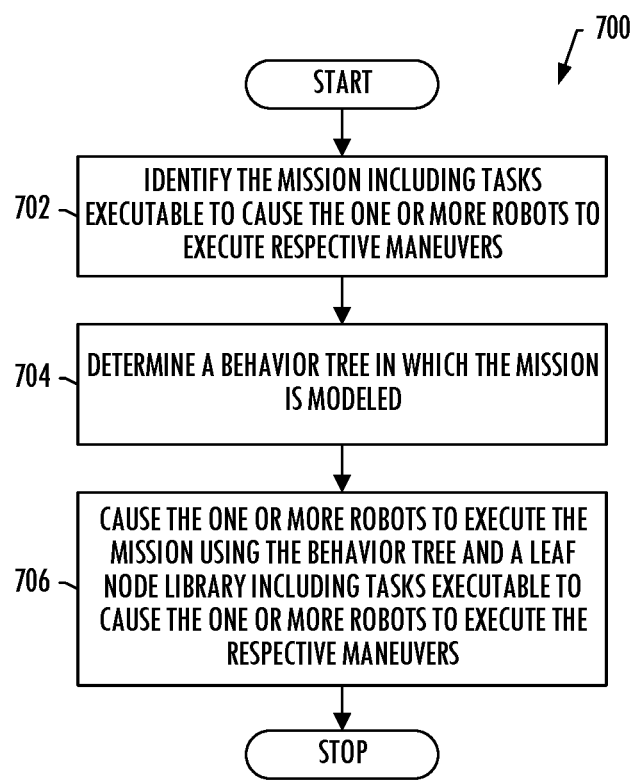
Figure 7B:
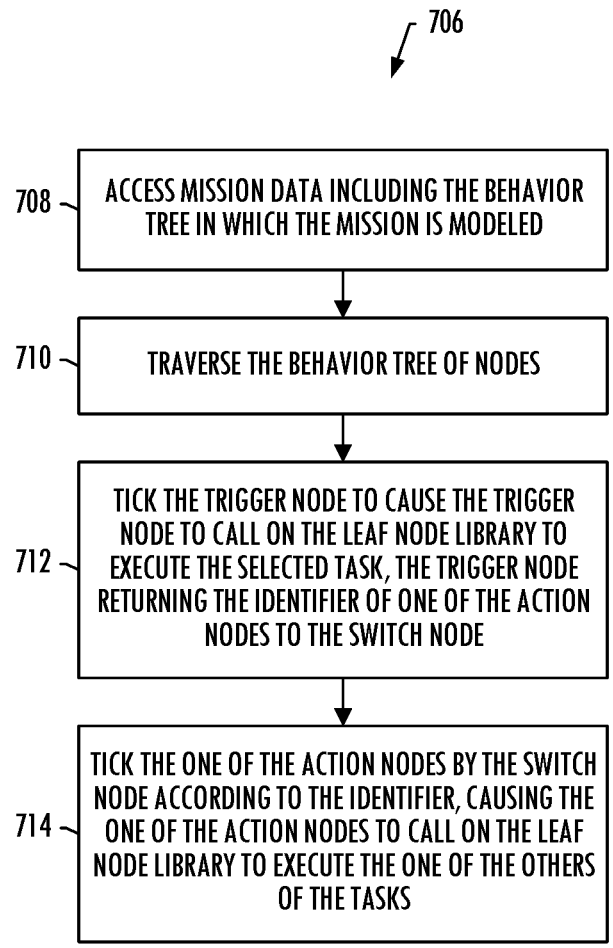
Figure 7C:
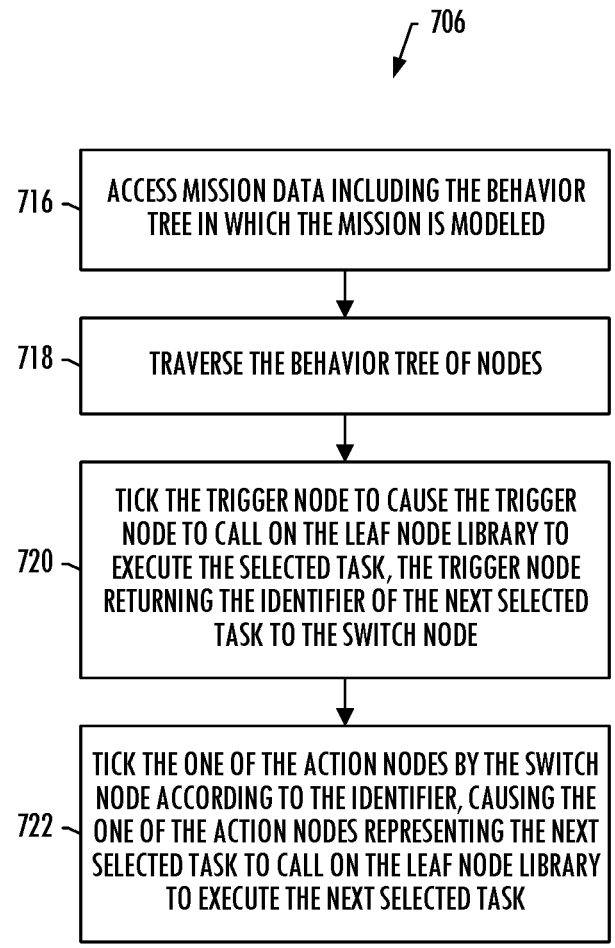
Figure 7D:
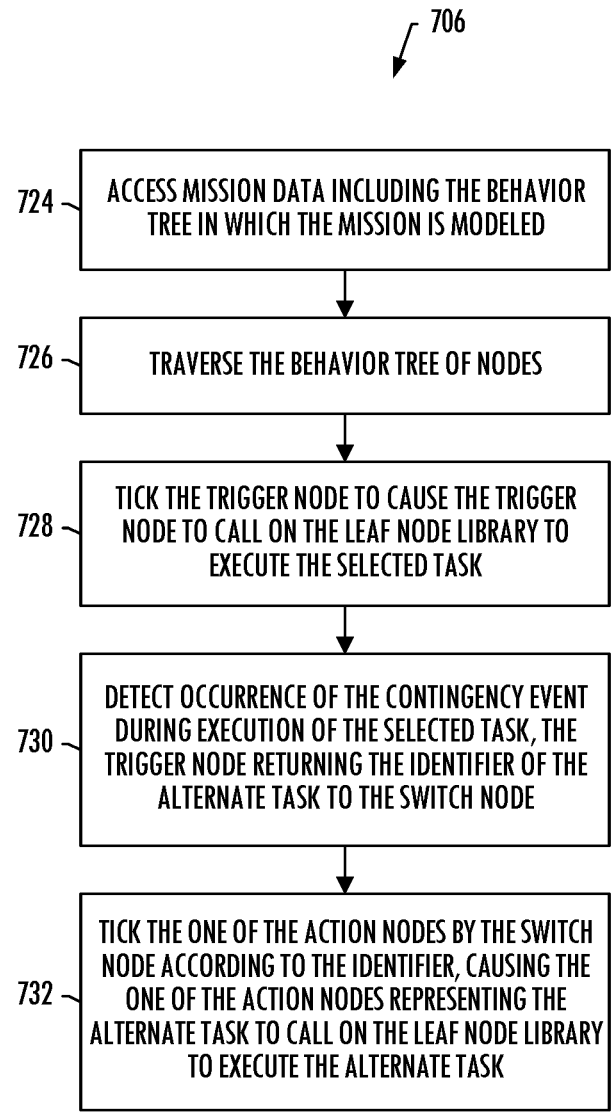
Figure 8:
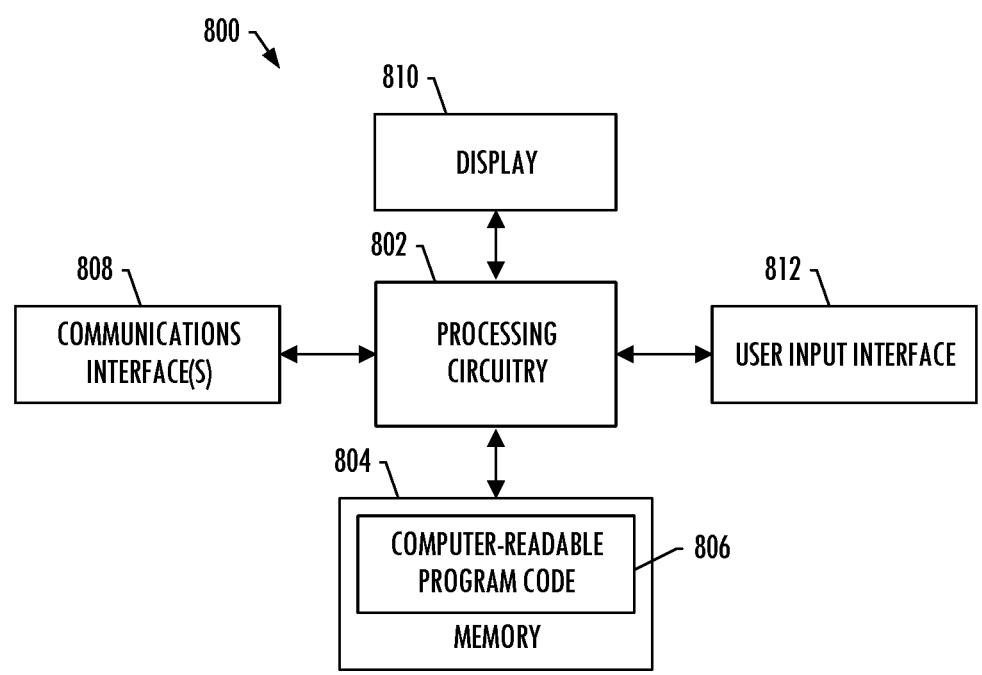

FIG. 3 more illustrates a mission management system (MMS) according to some example implementations;

FIG. 4 illustrates behavior tree nodes including control flow nodes 402 and execution nodes, according to some example implementations;

FIGS. 5A and 5B illustrate a behavior tree during planning a mission modeled in the behavior tree, according to some example implementations;

FIG. 6 is a diagram of services that may be implemented by one or more subsystems of the MMS, according to some example implementations;

FIGS. 7A, 7B, 7C and 7D are flowcharts illustrating various steps in a method of causing one or more robots to execute a mission, according to example implementations of the present disclosure; and FIG. 8 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute tasks to maneuver in its environment. The robot may be manned or unmanned. The robot may be fully human-controlled, or the robot may be semi-autonomous or autonomous in which at least some of the tasks are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
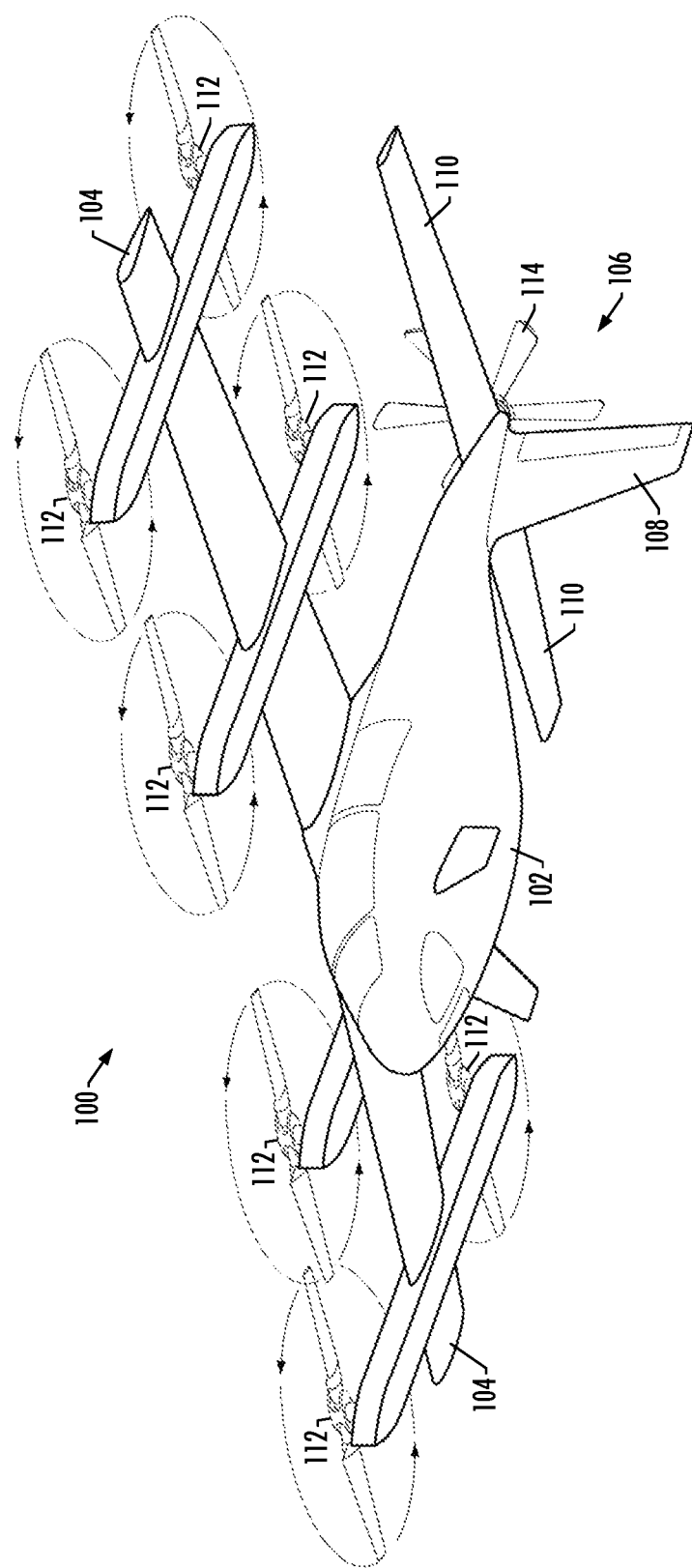
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
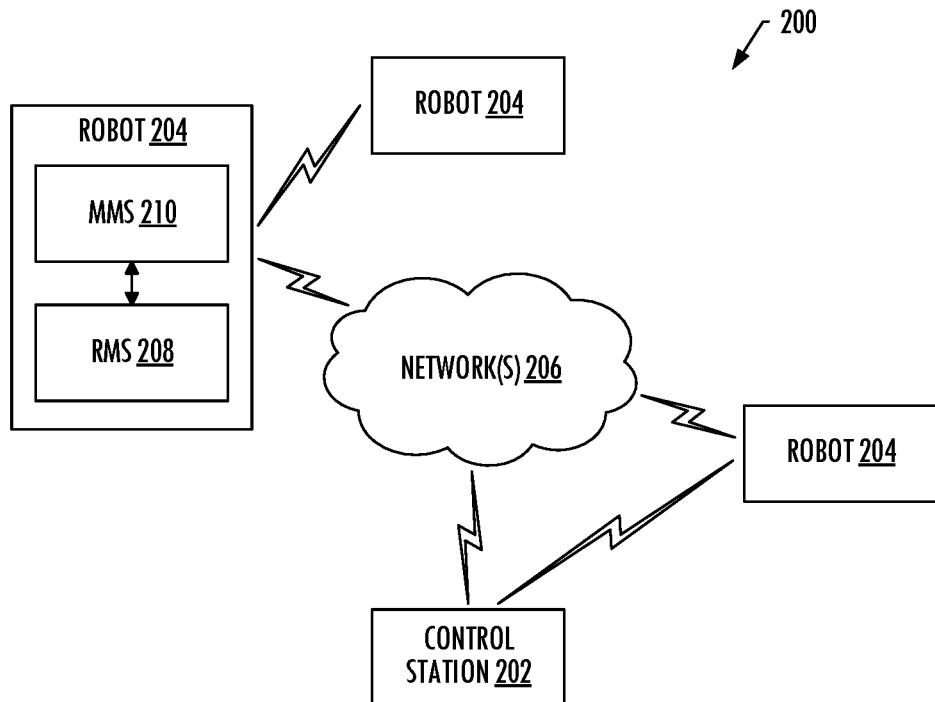
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

In some examples, the mission planning subsystem 306 is configured to plan a mission, and provide mission data for the mission to the mission execution subsystem 310 (directly or via the mission coordination subsystem 308). The mission and in particular the plurality of tasks of the mission may then be executed through the mission execution subsystem using the mission data. This may include the MMS 210 configured to send one or more maneuver commands to the RMS 208 to control the robot to follow the maneuver commands and thereby execute respective maneuvers.

In some examples, a mission may be modeled in a behavior tree. The behavior tree is a specific directed tree of nodes with internal nodes that are control flow nodes, and leave nodes that are execution nodes. Some of the execution nodes may represent tasks, assigned to one or more robots 204, which if executed, will accomplish objectives intrinsic to those tasks. A task may be executed by the mission execution subsystem 310 to cause one or more robots to execute one or more maneuvers with specific parameters and capabilities, such as by way of one or more maneuver commands. A task may include internal logic represented through one or more state machines, and may therefore be deterministic. In some examples, the internal logic of a task is defined during design of the system 200; and in some of these examples, the internal logic does not change during mission planning or execution.

In the behavior tree, the nodes are connected in a parent-child relationship. The behavior tree includes a root node that is a parent of other nodes, and that does not itself include a parent. The other nodes of the behavior tree include a parent and are therefore children, although one or more of these nodes may themselves be parent to further children. The internal nodes that are the flow control nodes include a parent and at least one child. The leaf nodes include a parent but no children.

Execution of the behavior tree begins at the root node, which sends signals called ticks to its children. A node is executed if and only if it receives a tick from its parent. When a node is ticked by its parent, the node returns the node's status to its parent. In this regard, the node returns "running" to its parent when the node is still executing, returns "success" when the node has achieved its goal, and returns "failure" when the node is not still executing but has also not achieved its goal.

The behavior tree may be constructed of any of a number of different types of control flow nodes and execution nodes. According to some example implementations of the present disclosure, there are seven types of control flow nodes, and three types of execution nodes. FIG. 4 illustrates behavior tree nodes 400 including control flow nodes 402 and execution nodes 404, according to some example implementations.

As shown, the control flow nodes 402 include a sequence node 406, a parallel node 408, a fallback node 410, a decorator node 412 and a switch node 414. The sequence node is used to execute its children in sequence, and the parallel node is used to execute its children in parallel. The fallback node is used when its children represent alternative means to achieve a similar goal. The decorator node may be used to selectively tick its child, or (among other things) manipulate the status of its child, based on a user-defined rule. The switch node may be used to tick a first child, and allow the first child to identify one of a number of other children that is next ticked by the switch node.

The execution nodes 404 include an action node 416, a trigger node 418 and a condition node 420. The action node is used to perform some user-defined action such as a task of a mission of one or more robots 204. The trigger node is a particular type of action node that is used to not only perform some user-defined action, but to also identify one of a number of other action nodes that is next ticked. The condition node evaluates some user-defined condition. Below is a table that summarizes the various types of nodes, and when those nodes return a status of success, failure or running.

TABLE

| Node Type | Success | Failure | Running |
| --- | --- | --- | --- |
| Sequence | If all children succeed | If one child fails | If one child returns running |
| Parallel | If >= M children succeed | If > N − M children fail | Else |
| Fallback | If one child succeeds | If all children fail | If one child returns running |
| Decorator | User-defined | User-defined | User-defined |
| Switch | If both the first (leftmost) child completes and the child that it identifies succeeds | If the identified child fails | While the first and identified child are running |
| Action | On completion | When impossible to complete | During its execution |
| Trigger | On completion, identifies child next ticked | When impossible to complete, identifies child next ticked | During its execution |
| Condition | If condition is true | If condition is false | During evaluation of condition (if not instantaneous) |

A task may exhibit a list of available predecessors that serves to indicate possible predecessor-successor transition logic. During a mission, the mission execution subsystem 310 may cause the one or more robots 204 to execute maneuvers and thereby the mission task-by-task. If a task can be executed to its end, the mission execution subsystem may next call a task connected to "nominal completion" exit criteria of the task; otherwise, the mission execution subsystem may next call a task connected to specific non-nominal completion of the task. When the task connected to the specific non-nominal completion of the task is called, it may be because something has prevented the internal logic to flow along the nominal path and the execution ended up into one of the many predefined possible conclusions.

Predecessors and exit criteria for a task may be during its design of a task, and considered during mission planning. In this regard, MMS 210 may use the mission planning subsystem 306 to plan a mission in one or more phases. In one phase, a mission may be composed by a nominal sequence of selected tasks connected through nominal completion exit criteria and available predecessors. Task attributes such as routes may be added. FIG. 5A illustrates an example of a behavior tree 500 for including a sequence node 502 as its root, connected to action nodes 504 representing the selected tasks, in a parent-child relationship that describes a nominal sequence of the selected tasks. The sequence node illustrated in FIG. 5A is a particular type of sequence node, namely, a sequence node with memory (designated by "*").

In another phase, specific behaviors may be assigned to failure modes of certain identified tasks. One or more contingency paths may be added to create alternatives to the nominal sequence of selected tasks when one or more tasks the nominal sequence cannot be successfully executed. In some examples, a local contingency event may prevent a certain identified task from achieving its nominal completion exit criteria, and instead lead to a specific non-nominal completion of the task. Resolving a local contingency event may occur outside of the identified task by making use of one or more alternate tasks within the mission.

In yet another phase, one or more alternate task graphs of alternate tasks assigned to global contingency events may be added. Global contingency events may include contingency events that usually have nothing to do with the specific task execution and are instead related to one or more failures of the robot 204 (e.g., engine failure, navigation failure, link loss, battery failure). That is, global contingency events may include contingency events that are not associated with a specific task. Global contingency events may also include contingency events in which a task fails execution in such a way that would normally produce a local contingency event, but there is not otherwise a contingency path for the local contingency event.

FIG. 5B illustrates the behavior tree 500 further including action nodes 506 representing alternate tasks to be executed when a contingency even such as a local contingency event or a global contingency event occurs during execution of a selected task in the nominal sequence of selected tasks. As shown, for example, the behavior tree includes a switch node 508, a trigger node 510 representing a selected task, and the action nodes include an action node 512 representing a next selected task, and action nodes representing alternate tasks. The action nodes for the alternate tasks are organized in three branches of the behavior tree, and include control flow nodes leading to them. These action nodes include, for example, action nodes 514. The switch node is connected to the trigger node and the action nodes in a parent-child relationship in which the trigger node and the action nodes are children of the switch node. The trigger node is a first of the children that, when ticked by the switch node, returns an identifier of one of the action nodes to trigger the switch node to next tick the one of the action nodes.

Absent a local or global contingency event, the trigger node 510 returns the identifier of the next selected task (as shown, "0") to the switch node 508, and the switch node ticks the action node 512 representing the next selected task. When a local or global contingency event is detected, on the other hand, the trigger node returns the identifier of the alternate task to the switch node, or as shown, the identifier of a branch to alternate tasks (as shown, "3"). In some of these examples, the switch node is configured to tick an action node representing the alternate task according to the identifier, or as shown, the action nodes 514 in sequence according to the intervening sequence node (as shown, a sequence node with memory).

Returning to FIG. 3, in some examples in which a mission is modeled in a behavior tree, tasks executable to cause a robot 204 or a type of robot to execute maneuvers may be designed, and a leaf node library of tasks executable to cause the robot or type of robot to execute the maneuvers may be developed. During mission planning, then, MMS 210 may use the mission planning subsystem 306 to plan a mission including a nominal sequence of selected tasks that are executable to cause one or more robots (of the type of robot) to execute respective maneuvers to achieve a mission objective. The mission data provided by the mission planning subsystem 306 to the mission execution subsystem 310 may include the behavior tree, and the mission execution subsystem may use the behavior tree and the leaf node library to cause the robot 204 to execute the mission. This may include the MMS configured to execute the selected tasks and send one or more maneuver commands (e.g., waypoints, steering commands) to the RMS 208 to control the robot to follow the maneuver commands and thereby execute the respective maneuvers.

According to some example implementations, the mission execution subsystem 310 is configured to implement various software functionality or functionalities (at times referred to as services) to perform its respective functions. FIG. 6 is a diagram of services 600 that may be implemented by one or more subsystems of the MMS 210. As shown, the services may include a mission manager 602 service that may be implemented by the mission execution subsystem 310. The mission manager service is generally configured to identify a mission including tasks that are executable to cause one or more robots 204 to execute respective maneuvers. In some examples, the mission is identified from mission data 604.

The services 600 also include a task manager 606 service configured to access mission data 604 for the mission, and cause the robot(s) 204 to execute the mission according to the mission data. In some examples, the task manager service is configured to determine a behavior tree 608 in which the mission is modeled, which in some examples may include the task manager service configured to access the behavior tree from the mission data.

The behavior tree is expressed as a directed tree 610 of nodes 612 including a switch node 614, a trigger node 616 representing a selected task, and action nodes 618 representing others of the tasks. The switch node is connected to the trigger node and the action nodes in a parent-child relationship in which the trigger node and the action nodes are children of the switch node. The trigger node is a first of the children that, when ticked by the switch node, returns an identifier of one of the action nodes to trigger the switch node to next tick the one of the action nodes.

The task manager 606 service is configured to cause the robot(s) 204 to execute the mission using the behavior tree and a leaf node library 620 including the tasks 622 executable to cause the robot(s) to execute the respective maneuvers.

In some more particular examples, for a robot 204 of the robot(s), the task manager 606 service is configured to access the mission data 604 including the behavior tree 608 in which the mission is modeled. The task manager service is configured to traverse the behavior tree of nodes 612. And when the switch node 614 representing the selected task is ticked, the task manager service is configured to tick the trigger node 616 to cause the trigger node representing the selected task to call on the leaf node library 620 to execute the selected task 622A and thereby cause the robot to execute a respective maneuver. The trigger node is also caused to return the identifier of one of the action nodes 618 to the switch node.

In some further examples, the switch node 614 is configured to tick the one of the action nodes 618 according to the identifier returned by the trigger node 616. This causes the one of the action nodes representing one of the others of the tasks of the mission to call on the leaf node library 620 to execute the one of the others of the tasks 622 and thereby cause the robot 204 to execute another of the respective maneuvers.

As suggested above, a mission may contemplate the occurrence of various contingency events. These contingency events may include, for example, task-specific contingency events, local contingency events and/or global contingency events. A task-specific contingency event may be expressed in internal logic of a task 622. Other contingency events such as a local contingency event and/or a global contingency event may be expressed in the behavior tree 608 or an alternate behavior tree.

In some examples, the tasks of the mission include a nominal sequence of selected tasks that are executable to cause the robot(s) 204 to execute respective maneuvers to achieve a mission objective, and these selected tasks include the selected task and a next selected task. For a task-specific contingency event, in some examples, a selected task in the nominal sequence causes the robot(s) to execute a nominal maneuver, or an alternate maneuver when the task-specific contingency event occurs during execution of the nominal maneuver. In some of these examples, the leaf node library 620 includes the selected task 622A executable to cause the robot(s) to execute the nominal maneuver, or the alternate maneuver when the task-specific contingency event occurs.

In some further examples, the tasks of the mission also include an alternate task to be executed in place of the next selected task when a contingency event such as a local contingency event or a global contingency event occurs during execution of the selected task. The trigger node 616, then, represents the selected task, and the others of the tasks represented by the action nodes 618 include the next selected task and the alternate task. And further, the tasks 622 in the leaf node library 620 further include the alternate task 622B.

In some examples, the services 600 further include a contingency monitor 624 service that may be implemented by the mission execution subsystem 310. The contingency monitor service is configured to monitor for contingency events during the mission. This may include the contingency monitor configured to determine at least one of a state of the robot 204, a status of the robot, or a state of the environment, some or all of which may be reflected in or determined from input data. In some examples, at least some of the input data may be provided by or determined from data provided by various sensors onboard the robot, the RMS 208 and/or the control station 202, which may interface with the MMS 210 using the interface subsystem 302. The state of the environment may in some examples be provided by or determined from data provided by the situational awareness subsystem 304 of the MMS. The contingency monitor service is configured to detect a contingency event, and report the contingency event to the task manager 606 service.

When a contingency event (e.g., local contingency event, global contingency event) is not detected during execution of the selected task (i.e., absent occurrence of the contingency event), the trigger node 616 returns the identifier of the next selected task to the switch node 614. In some of these examples, the switch node 614 is configured to tick the one of the action nodes 618 representing the next selected task according to the identifier, causing the one of the action nodes to call on the leaf node library 620 to execute the next selected task 622A and thereby cause the robot 204 to execute another respective maneuver.

For a contingency event detected during execution of the selected task, in some examples, the trigger node 616 returns the identifier of the alternate task to the switch node 614. In some of these examples, the switch node 614 is configured to tick the one of the action nodes 618 representing the alternate task according to the identifier, causing the one of the action nodes to call on the leaf node library 620 to execute the alternate task 622B and thereby cause the robot 204 to execute the alternate task.

FIGS. 7A, 7B, 7C and 7D are flowcharts illustrating various steps in a method 700 of causing one or more robots 204 to execute a mission, according to example implementations of the present disclosure. The method includes identifying the mission including tasks that are executable to cause the one or more robots to execute respective maneuvers, as shown at block 702 of FIG. 7A. The method includes determining a behavior tree 608 in which the mission is modeled, and causing the one or more robots to execute the mission using the behavior tree and a leaf node library 620 including tasks 622 executable to cause the one or more robots to execute the respective maneuvers, as shown at blocks 704 and 706. The behavior tree expressed as a directed tree 610 of nodes 612 including a switch node 614, a trigger node 616 representing a selected task, and action nodes 618 representing others of the tasks. The switch node is connected to the trigger node and the action nodes in a parent-child relationship in which the trigger node and the action nodes are children of the switch node. The trigger node is a first of the children that, when ticked by the switch node, returns an identifier of one of the action nodes to trigger the switch node to next tick the one of the action nodes.

In some examples, causing the one or more robots 204 to execute the mission at block 706 includes, for a robot of the one or more robots, accessing mission data including the behavior tree 608 in which the mission is modeled, as shown at block 708 of FIG. 7B. The behavior tree of nodes 612 is traversed, as shown at block 710. And when the switch node 614 is ticked, the trigger node 616 is ticked to cause the trigger node representing the selected task to call on the leaf node library 620 to execute the selected task 622A and thereby cause the robot to execute a respective maneuver, the trigger node returning the identifier of one of the action nodes 618 to the switch node, as shown at block 712. In some further examples, the one of the action nodes is ticked by the switch node according to the identifier, as shown at block 714. The ticking of the one of the action nodes causes the one of the action nodes representing one of the others of the tasks to call on the leaf node library to execute the one of the others of the tasks and thereby cause the robot to execute another of the respective maneuvers.

Briefly returning to FIG. 7A, in some examples, the tasks include a nominal sequence of selected tasks including the selected task and a next selected task, and an alternate task to be executed in place of the next selected task when a contingency event occurs during execution of the selected task. In some of these examples, determining the behavior tree 608 at block 704 includes determining the behavior tree in which the others of the tasks represented by the action nodes 618 include the next selected task and the alternate task.

In some further examples, causing the one or more robots 204 to execute the mission at block 706 includes, for a robot of the one or more robots, accessing mission data including the behavior tree 608 in which the mission is modeled, as shown at block 716 of FIG. 7C. The behavior tree of nodes 612 is traversed, as shown at block 718. And when the switch node 614 is ticked, the trigger node 616 is ticked to cause the trigger node representing the selected task to call on the leaf node library 620 to execute the selected task 622A and thereby cause the robot to execute a respective maneuver, the trigger node returning the identifier of the next selected task to the switch node absent occurrence of the contingency event, as shown at block 720. In some even further examples, the one of the action nodes 618 is ticked by the switch node according to the identifier, as shown at block 722. The ticking of the one of the action nodes causes the one of the action nodes representing the next selected task to call on the leaf node library to execute the next selected task and thereby cause the robot to execute another respective maneuver.

Turning to FIG. 7D, in some examples, causing the one or more robots 204 to execute the mission at block 706 includes, for a robot of the one or more robots, accessing mission data including the behavior tree 608 in which the mission is modeled, as shown at block 724. The behavior tree of nodes 612 is traversed, as shown at block 726. And when the switch node 614 is ticked, the trigger node 616 is ticked to cause the trigger node representing the selected task to call on the leaf node library 620 to execute the selected task 622A and thereby cause the robot to execute a respective maneuver, as shown at block 728. Occurrence of the contingency event is detected during execution of the selected task, and the trigger node returns the identifier of the alternate task to the switch node in response to the occurrence of the contingency event, as shown at block 730. And in some further examples, the one of the action nodes 618 is ticked by the switch node according to the identifier, as shown at block 732. The ticking of the one of the action nodes causes the one of the action nodes representing the alternate task to call on the leaf node library to execute the alternate task 622B and thereby cause the robot to execute another respective maneuver.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 8 illustrates an apparatus 800 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for causing one or more aerial robots to execute a mission, the apparatus comprising:
   a memory having computer-readable program code stored therein; and
   processing circuitry configured to access the memory, and execute the computer-readable program code to cause the apparatus to at least:
   identify the mission including tasks that are executable to cause the one or more aerial robots to execute respective maneuvers;
   determine a behavior tree in which the mission is modeled, the behavior tree including a switch node, a trigger node representing a selected task, and action nodes representing others of the tasks,
     the switch node connected to the trigger node and the action nodes in a parent-child relationship in which the trigger node and the action nodes are children of the switch node,
     the trigger node being a first of the children that, when ticked by the switch node, returns an identifier of one of the action nodes to trigger the switch node to next tick the one of the action nodes, and
     the action nodes include one or more of:
       launch to hover,
       transition up,
       fly-to,
       approach, or
       vertical landing;
   cause the one or more aerial robots to execute the mission using the behavior tree and a leaf node library including the tasks executable to cause the one or more aerial robots to execute the respective maneuvers;
   detect occurrence of a contingency event during execution of the selected task,
     the contingency event to provide an alternative task to the selected task; and cause the one or more aerial robots to execute other respective maneuvers based on the alterative task causing the one or more aerial robots to execute maneuver commands using maneuver controls of the one or more aerial robots.

2. The apparatus of claim 1, wherein the apparatus, on behalf of an aerial robot of the one or more aerial robots, is caused to at least:
  access mission data including the behavior tree;
  traverse the behavior tree; and
    tick, based on the switch node being ticked, the trigger node to cause the trigger node representing the selected task to call on the leaf node library to execute the selected task and thereby cause the aerial robot to execute a respective maneuver, the trigger node returning the identifier.

3. The apparatus of claim 2, wherein the apparatus, on behalf of an aerial robot of the one or more aerial robots, is caused to:
  tick the one of the action nodes by the switch node according to the identifier, the ticking of the one of the action nodes causing the one of the action nodes representing one of the others of the tasks to call on the leaf node library to execute the one of the others of the tasks and thereby cause the aerial robot to execute another of the respective maneuvers.

4. The apparatus of claim 1, wherein the tasks include a nominal sequence of selected tasks including the selected task and a next selected task, and an alternate task to be executed in place of the next selected task when a contingency event occurs during execution of the selected task, and
  wherein the apparatus is caused to determine the behavior tree in which the others of the tasks represented by the action nodes include the next selected task and the alternate task.

5. The apparatus of claim 4, wherein the apparatus, on behalf of an aerial robot of the one or more aerial robots, is caused to at least:
  access mission data including the behavior tree in which the mission is modeled;
  traverse the behavior tree; and
    tick, based on the switch node being ticked, the trigger node to cause the trigger to call on the leaf node library to execute the selected task and thereby cause the aerial robot to execute a respective maneuver, the trigger node returning the identifier of the next selected task to the switch node absent occurrence of the contingency event.

6. The apparatus of claim 5, wherein the apparatus, on behalf of an aerial robot of the one or more aerial robots, is caused to:
  tick the one of the action nodes by the switch node according to the identifier, the ticking of the one of the action nodes causing the one of the action nodes representing the next selected task to call on the leaf node library to execute the next selected task and thereby cause the aerial robot to execute a third respective maneuver.

7. The apparatus of claim 4, wherein the apparatus, on behalf of an aerial robot of the one or more aerial robots, is caused to at least:
  access mission data including the behavior tree;
  traverse the behavior tree; and
  when the switch node is ticked,
    tick the trigger node to cause the trigger node to call on the leaf node library to execute the selected task and thereby cause the aerial robot to execute a respective maneuver, and
    detect occurrence of the contingency event during execution of the selected task, the trigger node returning the identifier of the alternate task to the switch node in response to the occurrence of the contingency event.

8. The apparatus of claim 1, wherein the apparatus, on behalf of an aerial robot of the one or more aerial robots, is caused to at least:
  dynamically replan the mission based on changes to the mission being made in real-time or near real-time as the mission is executed by the one or more aerial robots.

9. A method of causing one or more aerial robots to execute a mission, the method comprising:
  identifying the mission including tasks that are executable to cause the one or more aerial robots to execute respective maneuvers;
  determining a behavior tree in which the mission is modeled, the behavior tree including a switch node, a trigger node representing a selected task, and action nodes representing others of the tasks, the switch node connected to the trigger node and the action nodes in a parent-child relationship in which the trigger node and the action nodes are children of the switch node, the trigger node being a first of the children that, when ticked by the switch node, returns an identifier of one of the action nodes to trigger the switch node to next tick the one of the action nodes,
  wherein the action nodes include one or more of:
    launch to hover,
    transition up,
    fly-to,
    approach, or
    vertical landing;
  causing the one or more aerial robots to execute the mission using the behavior tree and a leaf node library including the tasks executable to cause the one or more aerial robots to execute the respective maneuvers;
  detecting occurrence of a contingency event during execution of the selected task, the contingency event to provide an alternative task to the selected task; and
  causing the one or more aerial robots to execute other respective maneuvers based on the alterative task causing the one or more aerial robots to execute maneuver commands using maneuver controls of the one or more aerial robots.

10. The method of claim 9, wherein causing the one or more aerial robots to execute the mission further includes for an aerial robot of the one or more aerial robots:
  accessing mission data including the behavior tree;
  traversing the behavior tree; and
    ticking, based on the switch node being ticked, the trigger node to cause the trigger node representing the selected task to call on the leaf node library to execute the selected task and thereby cause the aerial robot to execute a respective maneuver, the trigger node returning the identifier.

11. The method of claim 10, wherein causing the one or more aerial robots to execute the mission further includes for the aerial robot of the one or more aerial robots:
  ticking the one of the action nodes by the switch node according to the identifier, the ticking of the one of the action nodes causing the one of the action nodes representing one of the others of the tasks to call on the leaf node library to execute the one of the others of the tasks and thereby cause the aerial robot to execute another of the respective maneuvers.

12. The method of claim 9, wherein the tasks include a nominal sequence of selected tasks including the selected task and a next selected task, and an alternate task to be executed in place of the next selected task when a contingency event occurs during execution of the selected task, and wherein determining the behavior tree includes determining the behavior tree in which the others of the tasks represented by the action nodes include the next selected task and the alternate task.

13. The method of claim 12, wherein causing the one or more aerial robots to execute the mission includes for an aerial robot of the one or more aerial robots:

accessing mission data including the behavior tree;
traversing the behavior tree; and
ticking, based on the switch node being ticked, the trigger node to cause the trigger node to call on the leaf node library to execute the selected task and thereby cause the aerial robot to execute a respective maneuver, the trigger node returning the identifier of the next selected task to the switch node absent occurrence of the contingency event.

14. The method of claim 13, wherein causing the one or more aerial robots to execute the mission further includes for the aerial robot of the one or more aerial robots:

ticking the one of the action nodes by the switch node according to the identifier, the ticking of the one of the action nodes causing the one of the action nodes representing the next selected task to call on the leaf node library to execute the next selected task and thereby cause the aerial robot to execute a third respective maneuver.

15. The method of claim 12, wherein causing the one or more aerial robots to execute the mission includes for an aerial robot of the one or more aerial robots:

accessing mission data including the behavior tree;
traversing the behavior tree; and
ticking, based on the switch node being ticked, the trigger node to cause the trigger node to call on the leaf node library to execute the selected task and thereby cause the aerial robot to execute a respective maneuver; and
detecting occurrence of the contingency event during execution of the selected task, the trigger node returning the identifier of the alternate task to the switch node in response to the occurrence of the contingency event.

16. The method of claim 9, further comprising:
dynamically replanning the mission based on changes to the mission being made in real-time or near real-time as the mission is executed by the one or more aerial robots.

17. A computer-readable storage medium for causing one or more aerial robots to execute a mission, the computer-readable storage medium being non-transitory and having computer-readable program code stored therein that, in response to execution by processing circuitry, causes an apparatus to at least:

identify the mission, the mission including tasks that are executable to cause the one or more aerial robots to execute respective maneuvers;
determine a behavior tree in which the mission is modeled, the behavior tree including a switch node, a trigger node representing a selected task, and action nodes representing others of the tasks, the switch node connected to the trigger node and the action nodes in a parent-child relationship in which the trigger node and the action nodes are children of the switch node, the trigger node being a first of the children that, when ticked by the switch node, returns an identifier of one of the action nodes to trigger the switch node to next tick the one of the action nodes, wherein the action nodes include one or more of:
launch to hover,
transition up,
fly-to,
approach, or
vertical landing;
cause the one or more aerial robots to execute the mission using the behavior tree and a leaf node library including the tasks executable to cause the one or more aerial robots to execute the respective maneuvers;
detect occurrence of a contingency event during execution of the selected task,
the contingency event to provide an alternative task to the selected task; and
cause the one or more aerial robots to execute other respective maneuvers based on the alterative task causing the one or more aerial robots to execute maneuver commands using maneuver controls of the one or more aerial robots.

18. The computer-readable storage medium of claim 17, wherein for an aerial robot of the one or more aerial robots, the apparatus is caused to at least:

access mission data including the behavior tree;
traverse the behavior tree; and
tick, based on the switch node being ticked, the trigger node to cause the trigger node to call on the leaf node library to execute the selected task and thereby cause the aerial robot to execute a respective maneuver, the trigger node returning the identifier.

19. The computer-readable storage medium of claim 18, wherein, for the aerial robot of the one or more aerial robots, the apparatus is caused to:

tick the one of the action nodes by the switch node according to the identifier, the ticking of the one of the action nodes causing the one of the action nodes representing one of the others of the tasks to call on the leaf node library to execute the one of the others of the tasks and thereby cause the aerial robot to execute another of the respective maneuvers.

20. The computer-readable storage medium of claim 17, wherein the tasks include a nominal sequence of selected tasks including the selected task and a next selected task, and an alternate task to be executed in place of the next selected task when a contingency event occurs during execution of the selected task, and wherein the apparatus is caused to determine the behavior tree in which the others of the tasks represented by the action nodes include the next selected task and the alternate task.

21. The computer-readable storage medium of claim 20, wherein for an aerial robot of the one or more aerial robots, the apparatus is caused to at least:

access mission data including the behavior tree;
traverse the behavior tree; and
tick, based on the switch node being ticked, the trigger node to cause the trigger node to call on the leaf node library to execute the selected task and thereby cause the aerial robot to execute a respective maneuver, the trigger node returning the identifier of the next selected task to the switch node absent occurrence of the contingency event.

22. The computer-readable storage medium of claim 21, wherein for the aerial robot of the one or more aerial robots, the apparatus is caused to:
tick the one of the action nodes by the switch node according to the identifier, the ticking of the one of the action nodes causing the one of the action nodes representing the next selected task to call on the leaf node library to execute the next selected task and thereby cause the aerial robot to execute a third respective maneuver.

23. The computer-readable storage medium of claim 20, wherein for an aerial robot of the one or more aerial robots, the apparatus is caused to at least:
access mission data including the behavior tree;
traverse the behavior tree;
when the switch node is ticked, tick the trigger node to cause the trigger node to call on the leaf node library to execute the selected task and thereby cause the aerial robot to execute a respective maneuver;
access mission data including the behavior tree in which the mission is modeled;
traverse the behavior tree;
tick, based on the switch node being ticked, the trigger node to cause the trigger node to call on the leaf node library to execute the selected task and thereby cause the aerial robot to execute a respective maneuver; and
detect occurrence of the contingency event during execution of the selected task, the trigger node returning the identifier of the alternate task to the switch node in response to the occurrence of the contingency event.

24. The computer-readable storage medium of claim 17, wherein aerial robot of the one or more aerial robots, the apparatus is caused to:
dynamically replan the mission based on changes to the mission being made in real-time or near real-time as the mission is executed by the one or more aerial robots.

* * * * *